(12) United States Patent
Hutchison et al.

(10) Patent No.: US 9,628,724 B2
(45) Date of Patent: Apr. 18, 2017

(54) METHOD AND SYSTEM FOR PROVIDING SCENE DATA IN A VIDEO STREAM

(71) Applicant: DRS Network & Imaging Systems, LLC, Melbourne, FL (US)

(72) Inventors: David C. Hutchison, Plano, TX (US); Ralph K. Williamson, Plano, TX (US)

(73) Assignee: DRS Network & Imaging Systems, LLC, Melbourne, FL (US)

( * ) Notice: Subject to any disclaimer, the term of this patent is extended or adjusted under 35 U.S.C. 154(b) by 376 days.

(21) Appl. No.: 14/206,341

(22) Filed: Mar. 12, 2014

(65) Prior Publication Data

US 2015/0281749 A1 Oct. 1, 2015

Related U.S. Application Data

(60) Provisional application No. 61/785,856, filed on Mar. 14, 2013, provisional application No. 61/786,077, filed on Mar. 14, 2013.

(51) Int. Cl.
*G06K 9/00* (2006.01)
*H04N 5/33* (2006.01)
(Continued)

(52) U.S. Cl.
CPC ............... *H04N 5/33* (2013.01); *G01J 5/025* (2013.01); *G01J 5/0806* (2013.01); *G01J 5/10* (2013.01);
(Continued)

(58) Field of Classification Search
None
See application file for complete search history.

(56) References Cited

U.S. PATENT DOCUMENTS 5,323,334 A 6/1994 Meyers et al.
5,335,091 A 8/1994 Palum
(Continued)

FOREIGN PATENT DOCUMENTS

FR 2661583 A1 10/1991
WO 2012/170954 A2 12/2012

OTHER PUBLICATIONS

Notice of Allowance mailed Sep. 10, 2015 in U.S. Appl. No. 14/211,796, 11 pages.
(Continued)

*Primary Examiner* — Randolph I Chu
(74) *Attorney, Agent, or Firm* — Kilpatrick Townsend & Stockton LLP (57) ABSTRACT

Methods of and systems for providing temperature data in a video stream are provided. The method includes receiving a video stream having a plurality of video frames with a first frame rate and receiving temperature data having a plurality of temperature frames with a slower second frame rate. To interlace the temperature data, a subset of temperature frames in the plurality of temperature frames can be extracted. The method further includes transmitting each temperature frame in the subset of temperature frames with the plurality of video frames in a data stream. The method may further include identifying missing data in the subset of temperature frames and correlating the missing data with the plurality of video frames. Based on the correlation of the missing data with the plurality of video frames, missing data can be provided to the subset of temperature frames to reconstruct the full plurality of temperature frames.

20 Claims, 5 Drawing Sheets

(51) Int. Cl.

| | |
|---|---|
| *H04N 19/46* | (2014.01) |
| *G01J 5/02* | (2006.01) |
| *G01J 5/08* | (2006.01) |
| *G01J 5/10* | (2006.01) |
| *G06T 3/40* | (2006.01) |
| *G06T 5/00* | (2006.01) |
| *H04N 21/2343* | (2011.01) |
| *H04N 21/236* | (2011.01) |
| *H04N 21/434* | (2011.01) |
| *G01J 5/00* | (2006.01) |

(52) U.S. Cl.
CPC ............... *G06T 3/40* (2013.01); *G06T 5/001* (2013.01); *G06T 5/007* (2013.01); *H04N 19/46* (2014.11); *H04N 21/23439* (2013.01); *H04N 21/23605* (2013.01); *H04N 21/23614* (2013.01); *H04N 21/4348* (2013.01); *G01J 2005/0077* (2013.01); *G01J 2005/0081* (2013.01)

(56) References Cited

U.S. PATENT DOCUMENTS

| | | | |
|---|---|---|---|
| 5,350,911 | A | 9/1994 | Rafanelli et al. |
| 5,514,865 | A | 5/1996 | O'Neil |
| 5,717,208 | A | 2/1998 | Woolaway, II |
| 5,798,875 | A | 8/1998 | Fortin et al. |
| 5,811,808 | A | 9/1998 | Cannata et al. |
| 5,838,813 | A | 11/1998 | Kancler et al. |
| 5,994,699 | A | 11/1999 | Akagawa |
| 6,011,584 | A | 1/2000 | Allred et al. |
| 6,573,819 | B1 * | 6/2003 | Oshima ............ G11B 20/00007 348/51 |
| 7,370,975 | B2 | 5/2008 | Taniguchi et al. |
| 7,421,152 | B2 * | 9/2008 | Kang ................ H04N 5/2628 348/E5.055 |
| 7,622,715 | B2 | 11/2009 | Ignatowicz |
| 7,924,312 | B2 | 4/2011 | Packard |
| 7,995,859 | B2 | 8/2011 | Högasten |
| 7,996,066 | B2 | 8/2011 | Schlagheck et al. |
| 8,189,050 | B1 | 5/2012 | Hughes et al. |
| 8,247,770 | B2 | 8/2012 | Fischer |
| 8,373,757 | B1 | 2/2013 | Nguyen |
| 8,476,590 | B2 | 7/2013 | Stratmann et al. |
| 8,478,480 | B2 | 7/2013 | Mian et al. |
| 8,494,220 | B2 | 7/2013 | Del Grande |
| 8,649,932 | B2 | 2/2014 | Mian et al. |
| 8,787,619 | B2 | 7/2014 | Del Grande |
| 8,868,291 | B2 | 10/2014 | Mian et al. |
| 9,071,720 | B2 | 6/2015 | Ikari et al. |
| 9,251,595 | B2 | 2/2016 | Bailey et al. |
| 2004/0208395 | A1 | 10/2004 | Nomura |
| 2004/0232333 | A1 | 11/2004 | Guldevall |
| 2010/0030506 | A1 | 2/2010 | Cairnduff |
| 2011/0063427 | A1 | 3/2011 | Fengler et al. |
| 2011/0159959 | A1 * | 6/2011 | Mallinson ............ A63F 13/235 463/37 |
| 2011/0169961 | A1 | 7/2011 | Wu |
| 2011/0249014 | A1 * | 10/2011 | Kolstad ............... H04N 5/33 345/589 |
| 2012/0091340 | A1 | 4/2012 | Young |
| 2012/0162508 | A1 * | 6/2012 | Okuda ................ H04N 7/0127 348/459 |
| 2012/0224019 | A1 | 9/2012 | Samadani et al. |
| 2013/0050453 | A1 | 2/2013 | Bergstrom et al. |
| 2013/0083199 | A1 | 4/2013 | Choi et al. |
| 2013/0088604 | A1 | 4/2013 | Hamrelius et al. |
| 2013/0345545 | A1 * | 12/2013 | Gross ..................... A61B 5/055 600/411 |
| 2014/0253735 | A1 | 9/2014 | Fox et al. |
| 2014/0270563 | A1 | 9/2014 | Bailey et al. |
| 2015/0281598 | A1 | 10/2015 | Southerland et al. |
| 2015/0281749 | A1 | 10/2015 | Hutchison et al. |
| 2016/0074724 | A1 * | 3/2016 | Terre ..................... A63B 57/357 356/4.01 |
| 2016/0086315 | A1 | 3/2016 | Bailey et al. |

OTHER PUBLICATIONS

International Search Report and Written Opinion mailed Sep. 30, 2014 in Int'l Patent Application No. PCT/US2014/027610, 12 pages.

International Search Report and Written Opinion mailed Aug. 27, 2014 in Int'l Patent Application No. PCT/US2014/028922, 10 pages.

U.S. Appl. No. 14/206,297, Non-Final Office Action mailed May 9, 2016, 7 pages.

U.S. Appl. No. 14/964,165, Notice of Allowance mailed Jul. 29, 2016, 10 pages.

* cited by examiner

De-interlacer Input 302

Field 0 — 304: Line 1, Line 5, ..., Line h-3

Field 1 — 306: Line 2, Line 6, ..., Line h-2

Field 2 — 308: Line 3, Line 7, ..., Line h-1

Field 3 — 310: Line 4, Line 8, ..., Line h

Re-Construction 312

314: Line 1, Missing Data, Line 5, Missing Data, ..., Missing Data, Line h-3, Missing Data 316: Line 2, Missing Data, Line 6, Missing Data, ..., Missing Data, Line h-2, Missing Data 318: Line 3, Missing Data, Line 7, Missing Data, ..., Missing Data, Line h-1, Missing Data 320: Line 4, Missing Data, Line 8, Missing Data, ..., Missing Data, Line h, Missing Data

De-Interlacer Output 322

324: Line 1, Line 2, Line 3, Line 4, Line 5, Line 6, Line 7, Line 8, ..., Line h-3, Line h-2, Line h-1, Line h

METHOD AND SYSTEM FOR PROVIDING SCENE DATA IN A VIDEO STREAM

CROSS-REFERENCES TO RELATED APPLICATIONS

This application claims priority to U.S. Provisional Patent Application No. 61/785,856, filed Mar. 14, 2013 entitled "Method and System for Providing Scene Data in a Video Stream," and U.S. Provisional Patent Application No. 61/786,077, filed Mar. 14, 2013, entitled "Method and Systems for Producing a Temperature Map of a Scene," the disclosures of which are hereby incorporated in their entirety by reference for all purposes. This application is related to U.S. patent application Ser. No. 14/211,796, filed on Mar. 14, 2014, entitled "METHOD OF SHUTTERLESS NON-UNIFORMITY CORRECTION FOR INFRARED IMAGERS."

The following two regular U.S. patent applications (including this one) are being filed concurrently, and the entire disclosure of the other application is incorporated by reference into this application for all purposes:

Application Ser. No. 14/206,297, filed Mar. 12, 2014, entitled "Methods and System for Producing a Temperature Map of a Scene";

Application Ser. No. 14/206,341, filed Mar. 12, 2014, entitled "Method and System for Providing Scene Data in a Video Stream".

BACKGROUND OF THE INVENTION

The electromagnetic spectrum encompasses radiation from gamma rays, x-rays, ultra violet, a thin region of visible light, infrared, terahertz waves, microwaves, and radio waves, which are all related and differentiated in the length of their wave (wavelength). All objects, as a function of their temperatures, emit a certain amount of radiation. For terrestrial objects, a significant portion of this radiation is emitted in the infrared.

Thermal cameras can detect this radiation in a way similar to the way a photographic camera detects visible light and captures it in a photograph. Because thermal cameras detect and capture infrared light, thermal cameras can work in complete darkness, as ambient light levels do not matter and are not needed. Images from infrared cameras typically have a single color channel because thermal cameras generally use sensors that do not distinguish different wavelengths of infrared radiation. Color thermal cameras require a more complex construction to differentiate wavelength and color has less meaning outside of the normal visible spectrum because the differing wavelengths do not map uniformly into the system of color visible to and used by humans.

The monochromatic images from infrared cameras are often displayed in pseudo-color, where changes in color are used, as opposed to changes in intensity, to display changes in the signal, for example, gradients of temperature. This is useful because although humans have much greater dynamic range in intensity detection than color overall, the ability to see fine intensity differences in bright areas is fairly limited. Therefore, for use in temperature measurement, the brightest (warmest) parts of the image are customarily colored white, intermediate temperatures reds and yellows, transitioning to blues and greens, with the dimmest (coolest) parts black. A scale should be shown next to a false color image to relate colors to temperatures.

Thermal cameras have many applications, particularly when light and visibility are low. For example, thermal cameras have been used in military applications to locate human beings or other warm entities. Warm-blooded animals can also be monitored using thermographic imaging, especially nocturnal animals. Firefighters use thermal imaging to see through smoke, find people, and localize hotspots of fires. With thermal imaging, power line maintenance technicians locate overheating joints and parts, a telltale sign of their failure, to eliminate potential hazards. Where thermal insulation becomes faulty, building construction technicians can see heat leaks to improve the efficiencies of cooling or heating air-conditioning. Thermal imaging cameras are also installed in some luxury cars to aid the driver at night. Cooled infrared cameras can be found at major astronomy research telescopes, even those that are not infrared telescopes.

SUMMARY OF THE INVENTION

Embodiments of the present invention generally relate to optical systems and methods of processing thermal video signals. More particularly, the present invention relates to systems and methods of processing and transmitting infrared scene data of a scene, such as sonar data (e.g., for depth analysis) or thermal data (e.g., for temperature analysis). For example, a camera sensor may collect infrared scene data. The scene data can be processed into infrared (IR) video, which may be suitable for human viewing. The scene data may also be processed as temperature data which is useful for analyzing various aspects of the scene. Some scene data may not be suitable for human viewing, but may be used for analysis in other processes. In other embodiments of the invention, cameras and other suitable systems may be used to detect and gather scene data and video data of a scene, and transmit scene data in a video data stream.

According to an embodiment of the invention, a radiometric infrared camera is provided. The radiometric infrared camera can be configured to detect and capture scene data, such as thermal or sonar data, along with video data, of a scene. The video data may be processed separately from the scene data. For example, scene data such as thermal data captured and processed as a two-dimensional matrix representing a temperature map of the scene. The temperature map may then be transmitted separately from the video data to a camera interface for display to a user.

Video data may include visible light captured by the camera, and wavelengths of visible light captured typically may be in the range of 400-700 nm. Thermal data may include non-visible light, e.g. infrared light, captured by the camera, and wavelengths of infrared light captured may be as long as 14 µm. The video data in one embodiment of the invention can come from a thermal sensor. The thermal sensor can detect emitted radiation in a long wave infrared (LWIR) spectrum, and may not detect reflected radiation in the visible spectrum. The thermal sensor may operate in the LWIR spectrum (nominally 8-14 µm), and may output thermal video. From the post-NUC (pre-AGC) thermal video, a LUT may be used to create a temperature map. The camera then outputs a data stream that includes both the thermal video and the temperature map.

In one embodiment of the invention, the video contrast information described herein may be captured by a thermal camera. A change in the thermal radiation from an object in the scene may correspond simultaneously to a change in both video contrast and temperature information. The temperature information may be tracked at the same or different precision and timescale that is important for viewing video contrast information, and that updated temperature information may be provided and refreshed to the system less frequently than video contrast information.

Accordingly, processing and transmitting video data and scene data (e.g., thermal data) at the same frequency and same range may be bandwith-intensive, utilizing heavy processing resources and memory, and increasing processing time when a majority of the scene data may not be as relevant as the video data. However, other processing techniques of scene data may compromise accuracy and completeness of the scene data. Embodiments of the invention address this and other problems, and provide many benefits and advantages.

Methods of and systems for providing temperature data in a video stream are provided. The method includes receiving a video stream having a plurality of video frames with a first frame rate and receiving temperature data having a plurality of temperature frames with a slower second frame rate. To interlace the temperature data, a subset of temperature frames in the plurality of temperature frames can be extracted. The method further includes transmitting each temperature frame in the subset of temperature frames with the plurality of video frames in a data stream. The method may further include identifying missing data in the subset of temperature frames and correlating the missing data with the plurality of video frames. Based on the correlation of the missing data with the plurality of video frames, missing data can be provided to the subset of temperature frames to reconstruct the full plurality of temperature frames.

According to one embodiment of the invention, different processing and transmission techniques may be used to to separately process and transmit thermal data (e.g., a temperature map of a scene) and video data of a scene. For example, since thermal data may vary in a smaller relevant range and less quickly than video data, thermal data may be captured in a full range but only relevant portions of the thermal data may be processed and transmitted with the video data, without significantly compromising accuracy and completeness of thermal data of the scene. Selected portions of the thermal data may be transmitted with the video data, decreasing the amount of total data being transmitted in a data stream, thus decreasing the bandwith needed.

According to one embodiment of the invention, a method of providing scene data in a video stream is provided. The method includes receiving a video stream having a plurality of video frames characterized by a first frame rate. Subsequently, a scene data stream having a plurality of scene data frames with a second frame rate is received. Each scene data frame includes a plurality of scene data lines. The method further comprises generating a plurality of reduced scene data frames, wherein each of the plurality of reduced scene data frames is generated by: (a) extracting a subset of scene data lines from the plurality of scene data lines, wherein the subset is 1/N of the scene data lines; (b) forming a portion of a reduced scene data frame using the subset of scene data lines; and (c) iterating (a) and (b) N times. Once (a)-(c) have iterated N times, then the method includes transmitting the plurality of video frames at the first frame rate and the plurality of reduced scene data frames at the second frame rate in a data stream.

The method of providing scene data according to an embodiment of the invention may further include receiving the data stream and separating the plurality of video frames from the plurality of reduced scene data frames. For each reduced scene data frame in the plurality of reduced scene data frames, the method includes: identifying one or more missing data lines in the subset of scene data lines, corre-lating the plurality of reduced scene data frames with the plurality of video frames, providing the one or more missing data lines to the subset of scene data lines of the reduced scene data frame based on the correlation of the plurality of reduced scene data frames with the plurality of video frames, and creating a reconstructed scene data frame including the one or more missing data lines and the subset of scene data lines of the reduced scene data frame. Then a plurality of reconstructed scene data frames is generated using the reconstructed scene data frame created for each reduced scene data frame and the plurality of reconstructed scene data frames is transmitted.

In another embodiment of the invention, a system for providing scene data in a video stream is provided. The system includes a detector configured to receive a video stream having a plurality of video frames with a first frame rate and receive a scene data stream having a plurality of scene data frames with a second frame rate, each scene data frame including a plurality of scene data lines. A frame processing module may be configured to, for each scene data frame in the plurality of scene data frames: extract a subset of scene data lines in the plurality of scene data lines, thereby interlacing the scene data stream, create a reduced scene data frame including the subset of scene data lines, and generate a plurality of reduced scene data frames using the reduced scene data frame created for each scene data frame. The system may further comprise a first transmitter configured to transmit the plurality of reduced scene data frames at the second frame rate with the plurality of video frames at the first frame rate in a data stream.

The system according to an embodiment of the invention may further comprise a receiver configured to receive the data stream and separate the plurality of video frames from the plurality of reduced scene data frames. A frame reconstructing module in the system may be configured to, for each reduced scene data frame in the plurality of reduced scene data frames: identify one or more missing data lines in the subset of scene data lines, correlate the plurality of reduced scene data frames with the plurality of video frames, provide the one or more missing data lines to the subset of scene data lines of the reduced scene data frame based on the correlation of the plurality of reduced scene data frames with the plurality of video frames, create a reconstructed scene data frame including the one or more missing data lines and the subset of scene data lines of the reduced scene data frame, and generate a plurality of reconstructed scene data frames using the reconstructed scene data frame created for each reduced scene data frame. Then a second transmitter in the system may be configured to transmit the plurality of reconstructed scene data frames.

Reconstructing complete thermal data may be performed after transmission of the selected portions of the temperature data and the reconstruction may be based on correlations between the video data and thermal data in a post-process of the thermal data. Thus, benefits and advantages achieved by embodiments of the present invention include reduced bandwidth without compromising accuracy and completeness of thermal data, or other scene data. These and other embodiments of the invention, along with many of its advantages and features, are described in more detail in conjunction with the text below and attached figures.

DETAILED DESCRIPTION OF SPECIFIC EMBODIMENTS

Embodiments of the invention are related to methods and systems configured to capture, process, and transmit video and scene data. In one example, radiometric infrared cameras can capture video data as well as thermal data. In an embodiment of the invention, a portion of the scene data, such as thermal data (e.g., temperature map of the scene), may be selected and transmitted in a data stream with full video data. The thermal data and video data are analyzed and based on correlations between the partial thermal data and the full video data, missing thermal data is recreated based on the correlations. Thus, the missing thermal data, with the partial thermal data transmitted, may be used to reconstruct full thermal data. Accordingly, the thermal data may be transmitted at a lower rate than the video data, and may require less computing, processing, and storage resources related to transmitting lower amounts of thermal data relative to the full video data being transmitted.

Embodiments of the invention provide for methods of providing a temperature map with video data. In an embodiment of the invention, the temperature data is transmitted at a reduced frame rate using an N-field data interlacer, which splits the temperature data over multiple fields to be transmitted in portions. The split temperature data is then transmitted as part of the video codec frame in a data stream via a data stream transmitter. The video frame with a portion of the temperature map is received by a data stream receiver, via a USB, UWB, Wi-Fi, or any other suitable wired or wireless connection or communication protocol.

The video data from the data stream is extracted by and into a video codec, and the temperature data from the data stream is extracted by a de-interlacer, which uses the video data to fill in the missing gaps in temperature data. The temperature data in some embodiments contains gaps because it was transmitted at a significantly lower bit rate and thus only portions of the temperature data were transmitted with the video data. The separated video data and temperature data is then communicated to a display processor such that the video data and temperature data may be displayed on various devices (e.g., a smartphone, tablet, or computer). Displaying the video data with the temperature data allows an end user to interact with the device to determine the temperature of different scenes captured in the video data.

Figure 1:
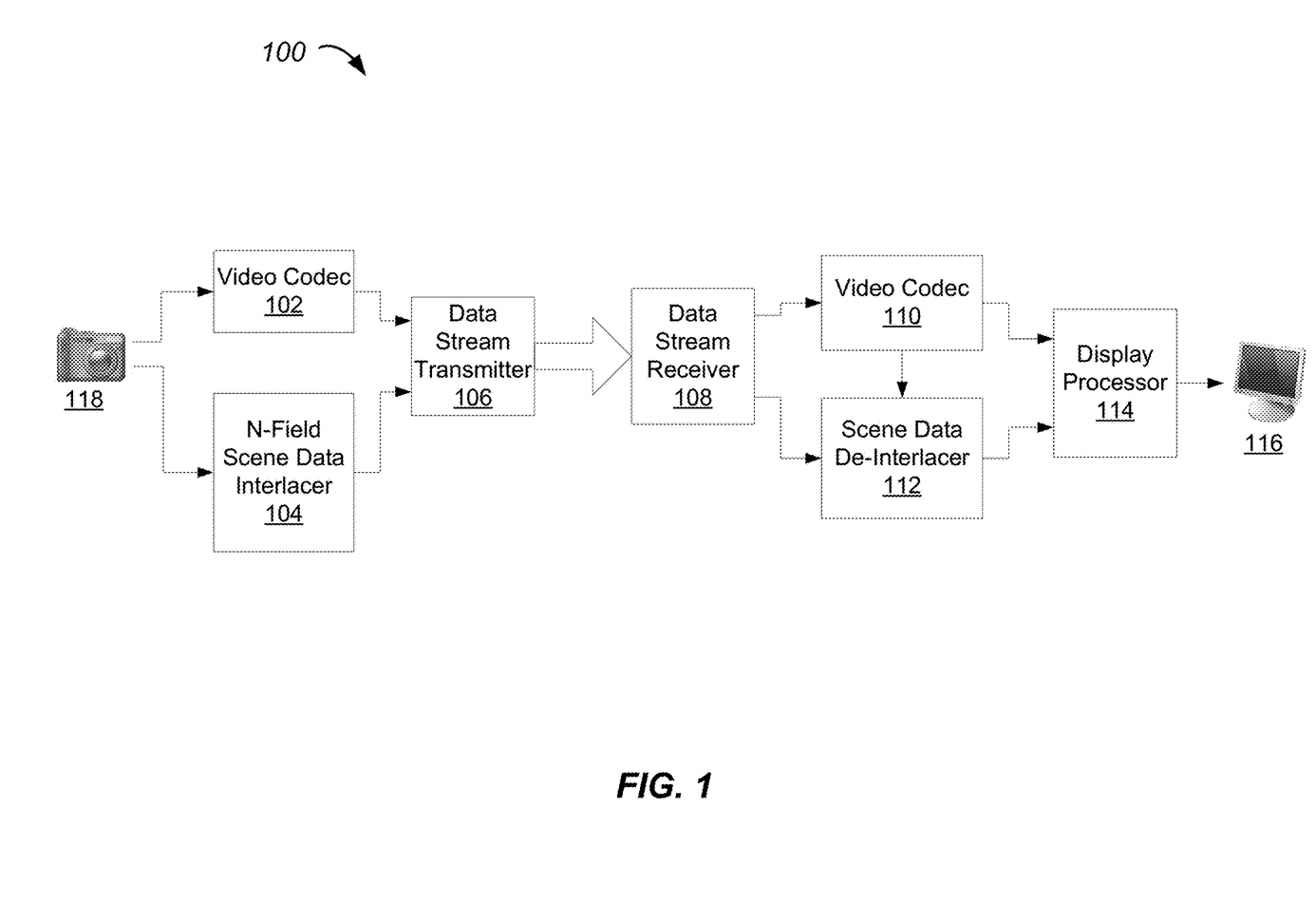
FIG. 1 shows a block diagram of an example system for transmitting temperature data in a video stream according to an embodiment of the invention.

FIG. 1 shows a block diagram illustrating a high-level example system 100 for transmitting scene data in a video stream according to one embodiment of the invention. System 100 illustrates an example of a radiometric infrared camera enabled to capture thermal (e.g., temperature) data and video data for transmission in a video stream according to one embodiment of the invention. In other embodiments of the invention, other devices and systems may be used such that other types of scene data may be captured, processed, and transmitted; for example, sonar data may be used to provide depth analysis of a scene. In the example shown in FIG. 1, thermal data may be captured by a radiometric infrared camera 118.

In one embodiment of the invention, the camera 118 may capture thermal data and convert the thermal data into infrared (IR) video, using processing techniques such as automatic gain control (AGC), local area processing (LAP), etc. The thermal data may then be used to generate a temperature map (e.g., radiometric data). The IR video data is processed with a video codec 102 and then transmitted by a data stream transmitter 106, in some embodiments, to a display side, such as a monitor, phone, or other external device. In another embodiment, the radiometric camera 118 may be enabled to process and display thermal and video data in real-time on a monitor or display on the body of the radiometric camera. To display the IR video data on display 116, such as a monitor or television, the video data in the data stream may be received at a data stream receiver 108. The IR video data in the data stream is processed again through a video codec 110 on the display side, which is then processed through a display processor 114 and the video data may be viewed on display 116.

In an embodiment of the invention, there may be a sensor processing module (not shown) between the camera 118 and the video codec 102/N-field scene data interlacer 104. The sensor processing module may receive sensor data gathered from the camera and generate an output including a video stream and radiometric data (e.g., thermal). The video stream may then be processed through the video codec 102, and the radiometric data may be processed through the N-field scene data interlacer 104.

In another embodiment of the invention, the camera may be configured such that it uses a visible light sensor and same or different techniques to minimize data transmissions. The camera 118 may simultaneously capture visible light video of a scene along with the thermal data of the scene.

Simultaneously, thermal data may be captured by the camera 118. To have the video data and thermal data correlate properly, the thermal data may be transmitted at the same frame rate as the video data because the thermal data may be used to numerate temperature on the display 116. For example, to show on the display a ball bouncing across the floor, the thermal data may show the temperature that is representative of the ball as it is moving. Thus the thermal data may be in synchronization with the video data to accurately represent the temperature of the scene in real-time.

According to one embodiment of the invention, scene data, such as thermal data, may be processed using an N-field interlacer 104. In contrast to visible light video (e.g., television) typically processed in two fields such that odd lines are processed first and the even lines next, thermal data may be processed using N-fields where N can be a number of two or greater, and can be an odd number. Thermal data may be processed with more than two fields because it may be processed at a slower rate than video data. Visible light video data (e.g., television video) can be processed in two fields to capture more data quickly, for example, television video data representing moving objects. Television video data may be sent to the display 116 at a high frame rate, but can be compressed for transmission between the data stream transmitter 106 and the data stream received 108. In contrast, thermal data may be transmitted at a lower frame rate than the video data. However, to retain accuracy, different compression algorithms may be used to transmit thermal data from compression algorithms used to transmit video data.

Historically, this has been done as a way to save video bandwidth. Our embodiment extends that to radiometric data and also extends by going beyond 2 fields. In an embodiment of the invention, a full video frame and 1/nth of the radiometric frame is transmitted.

Figure 2:
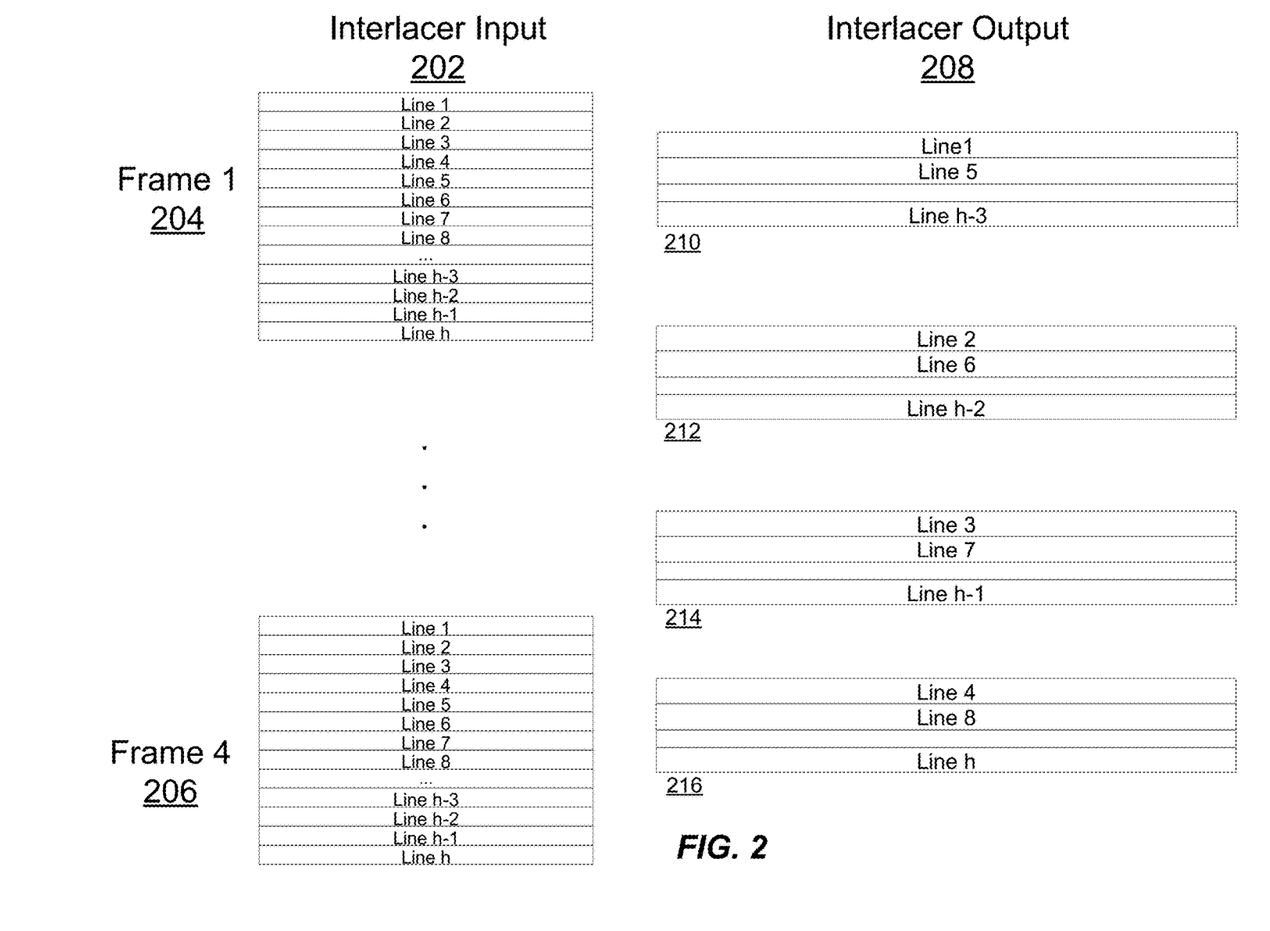
FIG. 2 shows an example of temperature data input and temperature data output illustrating an example method of transmitting temperature data in a video stream according to an embodiment of the invention.

FIG. 2 illustrates a thermal input 202 of an N-field interlacer 104 of FIG. 1 and its resulting thermal output 208. For example, in a sequence of four frames representing four-field processing (i.e., N=4), each frame has a plurality of lines containing a full thermal data of a scene. Frame 1 (204) has lines 1 through line h, up to Frame 4 (206), also having lines 1 through line h. Intermediate frames 2 and 3 (not shown) also may have lines 1 through line h containing full thermal data of the scene per frame. In the embodiment shown in FIG. 2, a frame is a represents thermal data that has been captured over a unit of time such as 16.67 ms. In another embodiment of the invention, a frame can be a shutter capture of thermal data and the lines that frame contain thermal data that may be transmitted at a frequency (e.g., frame rate).

A field may represent a subset of lines from the frame. Thus a 4-field interlacer 104 would transmit for a first frame (e.g., field), only (Line MOD 4=1) lines are transmitted. MOD is the mathematical modulus operator representing the remainder of a divisional operation. Therefore for the input frame 1 (204) of the interlacer input 202 containing lines Line 1 through Line h, only lines with line numbers having 1 as a remainder after being divided by 4 (e.g., 1, 5, ..., h-3) would be transmitted, resulting in a first output frame 210 containing lines Line 1 and other lines from Line 5 through Line h-3 having MOD 4=1. For a second frame (not shown) having lines Line 1 through Line h, only lines (Line MOD 4=2) are transmitted; therefore, the interlacer output 208 for the second frame can be shown in the second output frame 212 containing lines Line 2 and other lines from Line 6 through Line h-2 having MOD 4=2. For a third input frame (not shown) having lines Line 1 through Line h, only lines (Line MOD 4=3) are transmitted.

Accordingly, the interlacer output 208 for the third frame (not shown in FIG. 2) can be represented by the third output frame 214, containing lines Line 3 and other lines from Line 7 through Line h-1 having MOD 4=3. For a fourth frame 206, only lines (Line MOD 4=0) are transmitted; therefore the interlacer output 208 for the fourth frame 206 can be represented by the fourth output frame 216, containing lines Line 4 and other lines from Line 8 through Line h having MOD 4=0. The interlacer 104 may continue for further frames in the plurality of frames containing thermal data.

In an embodiment shown in FIG. 2, first frame 204 may contain a complete set of temperature data, from which every 4th line is extracted for transmission and outputted into the interlacer output 208. Therefore, upon the receipt of 4 frames in the interlacer output 208 (shown as frames 210, 212, 214, and 216), a complete set of temperature data for the first frame is received. Accordingly, frame 216 of the interlacer output 208 contains line 4 of a frame in the interlacer input 202 (e.g., from frame 1 204 or frame 4 206). In this embodiment the temperature map is only used every 4 frames, therefore a single temperature map is used for all 4 frames. The unused temperature data is discarded.

In another embodiment, the method can include storing all of the data at the first frame. In the 4th cycle, line 4 in 216 is created with a portion of the temperature data is extracted from the original temperature map. Accordingly, line 4 of 216 is temperature data three cycles later than the temperature data in line 1 in 210 of the interlacer output 208. As such, every frame contains a full temperature map, but only a portion of the temperature map is extracted, transmitted, and reconstructed on the receiving end.

By processing the thermal data input 202 using the N-field interlacer 104 of FIG. 1, the bandwidth required to transmit the thermal data may be reduced, as less lines per frame of thermal data are sent to the data stream transmitter 106 of FIG. 1. The video data may continue processing at a video frame rate and all frames are transmitted with all lines of video data to the data stream transmitter 106. Thus, the N-field interlacer 104 is used for selecting a subset of lines of frames for scene data, such as thermal data and/or sonar data, to determine temperature and/or depth of a scene, respectively. Therefore, according to an embodiment of the invention, the bandwidth for scene data (e.g., thermal data) may be reduced by a factor of N relative to the video data bandwidth. The bandwidth for scene data may be enabled to transmit the same number of frames originally received in the interlacer input 202 of FIG. 2, but for each interlacer input frame having a total number of lines of data, a subset of the lines of data are selected to create a reduced frame in the interlacer output 208, each reduced frame representative of each original frame having the total number of lines. As such, a plurality of reduced scene data frames is generated by the N-field interlacer 104 to create interlaced scene data.

Referring back to FIG. 1, the data stream transmitter 106 can transmit a data stream including a full video stream from the video codec 102 and interlaced scene data stream from the interlacer output 208 of FIG. 2 as representing the analytical (e.g., thermal) data. Accordingly, in order to display the full video stream with a full analytical (e.g., thermal) data stream, the full scene data stream can be reconstructed based on the interlaced scene data stream from the interlacer output 208, which can be a reduced scene data stream since it includes a plurality of reduced frames having a portion or subset of the data lines originally in the full frame. To reconstruct the plurality of scene data frames having the total number of lines of data in each frame, the full video data may be analyzed. A correlation may be determined between the full video data and the reduced scene data. For example, thermal data and video data can have high correlation properties related to movement.

For example, a most recent video frame corresponding to a reduced thermal frame may be used to make some intelligent decisions on how to recreate missing data from the reduced thermal frame to reconstruct the full thermal frame. In one embodiment of the invention, each thermal frame can include a temperature map, thus only portions of the temperature map may be outputted from the N-Field interlacer 104 and transmitted by the data stream transmitter 106. The data stream received 108 may separate the reduced thermal data (e.g., portions of temperature map for each frame) and provide the reduced thermal data to a scene data de-interlacer 112. The scene data de-interlacer 112 can receive a reduced thermal frame, e.g. portions of a temperature map for every frame, collecting multiple reduced thermal frames until a full thermal frame can be reconstructed.

The scene data de-interlacer 112 uses the video data to interpolate the temperature map to missing data in the temperature map. When there is motion in the scene, the motion may be used, for example in the video data, to gather more recent temperature data. Alternatively, when there is no motion, different types of interpolation may be used to fill in the missing data in the temperature map.

In an embodiment of the invention, the N value for N-field interlacing the scene data may be adjustable with a boundary condition. For example, for N=9, a system may not have even multiples of nine lines of data available. So if a frame has 24 lines long, additional lines containing values of zeros may be added to create a frame of 27 lines for N-field interlacing with N=9.

The data stream transmitter 106 of FIG. 1 may transmit the data stream including video data and interlaced scene data stream using various techniques and methods. According to one embodiment of the invention, packetization of the data may occur to transmit the data stream from the data stream transmitter 106 to the data stream receiver 108. The camera 118 can be configured to transmit video data from the camera 118 to an external device (e.g., a phone) via a communications interfaces. Exemplary communications interfaces may include a Wi-Fi link for wireless communication or an USB link, thus transmission of data may include packetized segments of the data. Thus a full frame of video data plus a portion of the frame of scene data (e.g., thermal data) is packetized for transmission. For example, 70 packets can equal one total super frame, in which a super frame includes a full frame of video data and a full frame of scene data. The packets are transmitted by the data stream transmitter 106 and received at the external device, such as a phone. The received packets are then stored to build a buffer in the phone of total super data. Therefore for every one frame of video, a portion of one frame of scene data is transmitted. For example, referring to FIG. 2, for each frame of video data, one fourth of a frame of thermal data is transmitted. So over four frames of video data, one frame of thermal data is received, thus after the transmission of 4 full frames of video data, a complete frame of thermal data is received, representing a full temperature map of the scene.

FIG. 2 shows an example of an interlacer input 202 and its corresponding interlacer output 208. As shown in FIG. 2, the first frame of the interlacer input (Frame 1 (204)), includes frame lines line 1 through line h. Intermediate frames (i.e., Frame 2 and Frame 3) are not shown in this diagram for purposes of clarity. Frame 4 (206), which is the fourth frame of the interlacer output 202, includes frame line 1 through line h. As illustrated, each of the interlacer input frames includes all frame lines, i.e., lines 1 through line h.

The interlacer output 208 shows the output frames 210, 212, 214, and 216 corresponding to each input frame (i.e., Frame 1 204, Frame 2 (not shown), Frame 3 (not shown), and Frame 4 206, respectively. For example, frame 210 of the interlacer output 208 is the output corresponding to input frame 204 of the interlacer input 202. As can be observed in the output frames 210, 212, 214, and 216 of the interlacer output 208, each output frame contains every fourth line of the corresponding input frame. Thus, in each output frame, one quarter of the lines in the corresponding input frame are utilized to form the interlacer output out frames.

The interlacer 104 of FIG. 1 uses the interlacer input 202, which contains all of the video data to generate the interlacer output 208, which contains a selected portion (e.g., one quarter) of the data from the input. The portioned data is combined into a superframe with the video data, which is transmitted in the data stream transmitter 106 of FIG. 1. Although the N-field interlacer is shown in FIG. 2 to have N=4, any number for N may be used to divide the lines of the temperature data into portions.

According to one embodiment of the invention, during packetization, the packets containing the scene data are different from the packets of video data. For example, the scene data may have a different header from the video data, since the scene data and video data are processed differently and originate from different sources.

In other embodiments of the invention, transmission of the data stream from the data stream transmitter 106 to the data stream receiver 108 may occur through other methods and techniques of communication. For example, a wired (e.g., USB) or a wireless (e.g., Wi-Fi, telecommunications) communication interface may be utilized.

As an exemplary implementation, for cases in which the video data is highly correlated with the temperature data, a cross correlation would demonstrate the similarities between video and temperature data. In this case, a higher resolution could be utilized for portions of the frame of video data to interpolate the temperature at higher resolution. For less correlated regions, existing data could be utilized to interpolate the temperature at lower resolution.

Figure 3:
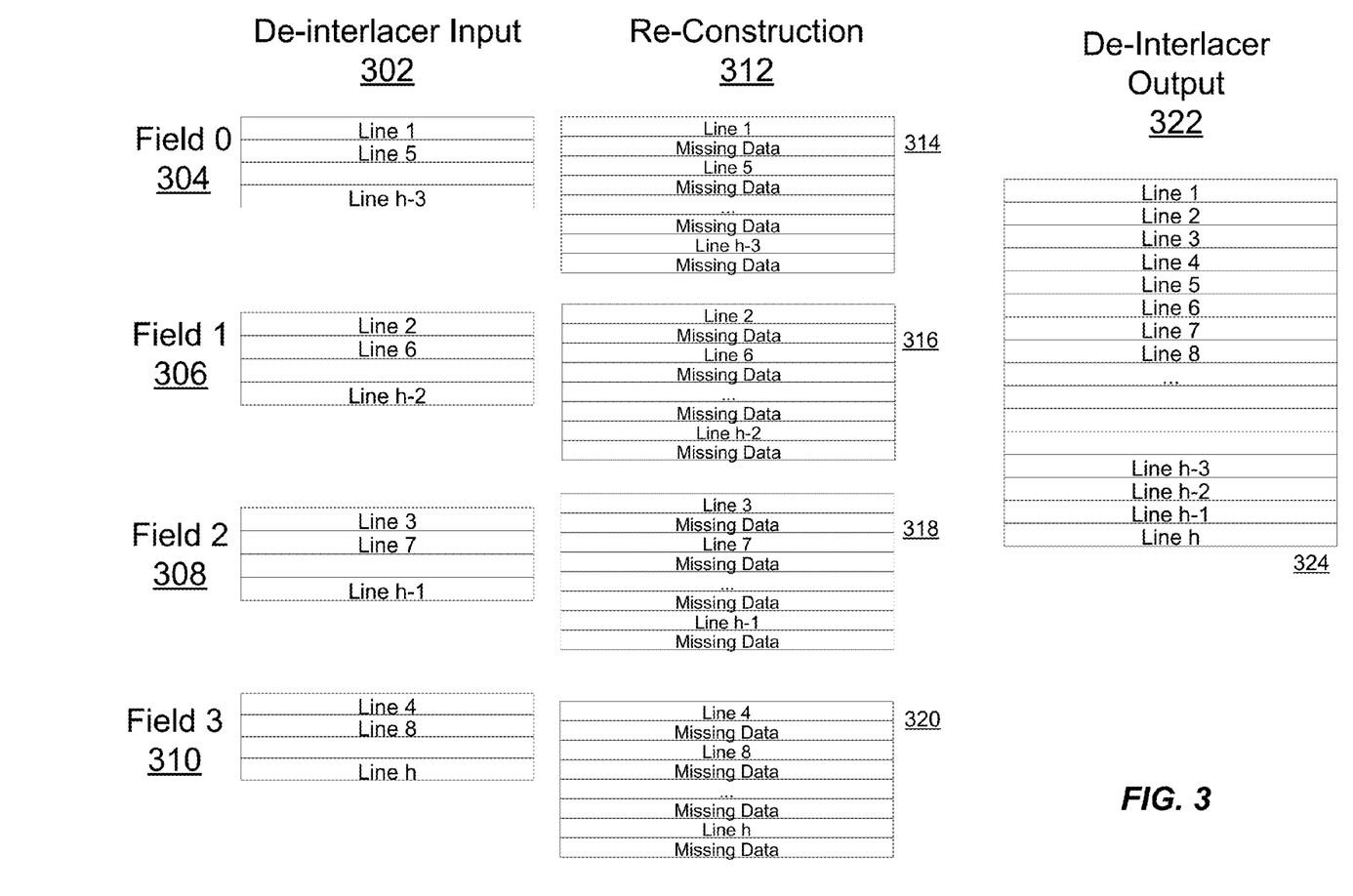
FIG. 3 shows an example of temperature data input and temperature data output illustrating an example method of reconstructing the transmitted temperature data from the video stream according to an embodiment of the invention.

FIG. 3 illustrates a de-interlacer input 302 for the scene data de-interlacer 112 of FIG. 1. The interlaced scene data stream, containing reduced scene data frames may be received as the de-interlacer input 302. The reduced scene data frames (e.g., reduced thermal data frames) may be stored in a buffer of an external device, such as a phone, monitor, or television. The de-interlacer input 302 may be reconstructed with missing data to create reconstructed data 312. For example, missing data may be provided and inserted between different lines that composed the reduced scene data frame received in the de-interlacer input 302.

For example, the de-interlacer input 302 can have four fields (e.g., frames) corresponding to four frames of the interlacer output 208 of FIG. 2. The de-interlacer input 302 of FIG. 3 may include Field 0 (304), Field 1 (306), Field 2 (308), and Field 3 (310), corresponding to interlacer output 208 of FIG. 2, such as output frame 1 (210), output frame 2 (212), output frame 3 (214), and output frame 4 (216), respectively. Field 0 (304) may include Line 1 and other lines from Line 5 through Line h-3 having MOD 4=1, corresponding to a first output frame 210 of FIG. 2. Field 1 (306) may include lines Line 2 and other lines from Line 6 through Line h-2 having MOD 4=2, corresponding to a second output frame 212 of FIG. 2. Field 2 (308) may include lines Line 3 and other lines from Line 7 through Line h-1 having MOD 4=3, corresponding to a third output frame 214 of FIG. 2. Field 3 (310) can include lines Line 4 and other lines from Line 8 through Line h having MOD 4=0, corresponding to a fourth output frame 216 of FIG. 2.

To provide the missing data lines in the reconstructed data 312, the video data may be analyzed to determine a correlation between the video data and the scene data (e.g., thermal data). For example, the video data and/or scene data (e.g., thermal data) can be highly correlated. Having knowledge of the content of the video data, for example, the location of objects are in that video and motion detected from the objects in the video, it can be determined as to which lines of the frames of thermal data are relevant and which lines are not. For example, in the analysis of the video data, if there is no motion between Field 0 and Field 3 in the video data, then any of the lines in the thermal data may be used since they are most likely to be unchanged (e.g., the same or insignificantly different). However, if there is motion, then the lines of thermal data occurring most recently to the motion detected in the video data may be selected to most accurately reflect that motion. More accurately, when there is motion, the missing lines are computed using an interpolation algorithm and using the data from the last good lines in the most recent field.

According to one embodiment of the invention, initially complete thermal data, such as a full temperature map, may be collected at the same point and time as full video data was collected. A portion of the thermal data, such as a portion of the temperature map, can be transmitted with each frame of the video data, such that eventually a full temperature map is eventually constructed after a certain number of video data frames are collected. As the full temperature map is being built with portions of the temperature map taken at different points and times, the total temperature map may have artifacts in it that are associated with rapid motion in the full video data. Therefore the motion defined by the video data processed by the video codec may help determine if the scene is a still scene, and either add all the partial thermal data frames, separate the frame of the video data at a time point, or select all of the thermal data frames from the original or last frame in the sequence at the time point. Missing data may be generated using an interpolation algorithm to compensate for motion in how the de-interlacer input 302 is supplemented to create the reconstructed data, for example, inserting missing data to rebuild the temperature map.

In one embodiment of the invention, the de-interlacer can fill in missing data shown in the re-construction data 312 of FIG. 3 using data from previous N fields. However, when there is motion in the image from one field to another, older fields lines may no longer be valid for that region. The de-interlacer makes use of the high correlation between the temperature stream and the video stream. In a region where the correlation is high, there may be no motion and the de-interlacer may use old line data to fill in the missing data lines. In regions where correlation is low, there may be motion, therefore the most recent field lines may be used in an interpolation algorithm to create the missing data to be used to fill in the missing data lines. Many interpolation algorithms may be used to create the missing data lines. In one embodiment of the invention, linear interpolation algorithms may be used. In another embodiment of the invention, quadratic interpolation algorithms may be used.

Corresponding to Field 0 (304) of the de-interlacer input 302, a reconstructed first frame can be shown in 314, having missing data lines in between the transmitted data lines Line 1 and Line 5 through Line h-3 having MOD 4=1. A reconstructed second frame can be shown in 316, corresponding to Field 1 (306), can have missing data lines in between the transmitted data lines Line 2 and Line 6 through Line h-2 having MOD 4=2. Corresponding to Field 2 (308), a reconstructed third frame can be shown in 316 and may have missing data lines in between the transmitted data lines Line 3 and Line 7 through Line h-1 having MOD 4=3. A reconstructed fourth frame 320, corresponding to Field 3 (310), can have missing data lines in between the transmitted data lines Line 4 and Line 8 thought Line h having MOD 4=0.

Using the reconstructed data frames 314, 316, 318, and 320, the originally transmitted lines may be extrapolated to recreate a full thermal data frame 324 as a de-interlacer output 322. The full thermal data frame 324 may have lines Line 1 to Line h.

As shown in FIG. 3, the de-interlacer output 322 is the output of the scene data de-interlacer 112 of FIG. 1. The reconstruction frames in 312 represent an intermediate step that is performed by the de-interlacer. The reconstruction process involves processing line 1, field 0, and detecting missing data between line 1 and line 5. Initially, the missing data may be filled with zeros, for processing purposes. The reconstruction process further includes reconstructing the frame with the missing data, which is done by processing video data and with respect to motion or other data in the video, interpolate the missing data. For example, interpolating missing data into the fields containing zeros may be based on information in the video data and information in the existing temperature map to generate actual lines 1 through h shown in the output frame 324 of the de-interlacer output 322.

If there is no motion in the scene, frame 324 of the de-interlacer output 322 would include lines from a combination of reconstruction frames 314, 316, 318 and 320. When there is no motion in the scene, then the lines of data from frame to frame have little variation, so copying the lines from one frame to another does not degrade the accuracy of the data significantly. However, when there is motion, then there is variance in the lines of data from frame to frame in the reconstruction frames 312. Therefore, the de-interlacer 112 of FIG. 1 interpolates the data in frame 320 because the most recent data is desired to represent the temperature. The reconstruction involves interpolating between the lines 4, 8, etc. of frame 320 to generate a temperature map and may use as part of that motion information some correlated properties between the video and the temperature map.

When the data is transmitted, the scene data and the video data directly correspond to each frame one to one. For example, when a new frame of video data is received, a full, new frame of scene data or temperature data is received at the same time. The bandwidth is reduced for transmission by interlacing is because at the destination the same bandwidth is not needed as the temperature does not change as quickly. Therefore, if the end user requests a high response then the N-field interlacer may be set to a lower N value. Alternatively, a higher N-value for the N-field interlacer results in a slower response or lower bandwidth for the scene data. The effect of changing N values is that the number of fields may effect the time it takes to reconstruct a full frame (e.g., more fields results in more cycles to receive every 1/Nth frame to reconstruct a full frame).

In an embodiment of the invention, the thermal camera may utilize a buffer to store frames of scene data that are being received at a constant rate. The frames of scene data may be stored and the retrieved from the buffer as appropriate. For example, when a new frame of scene data is received, a portion of interlaced data for the frame may be transmitted and then combined with scene data from the buffer to reconstruct the whole frame of scene data.

Figure 4:
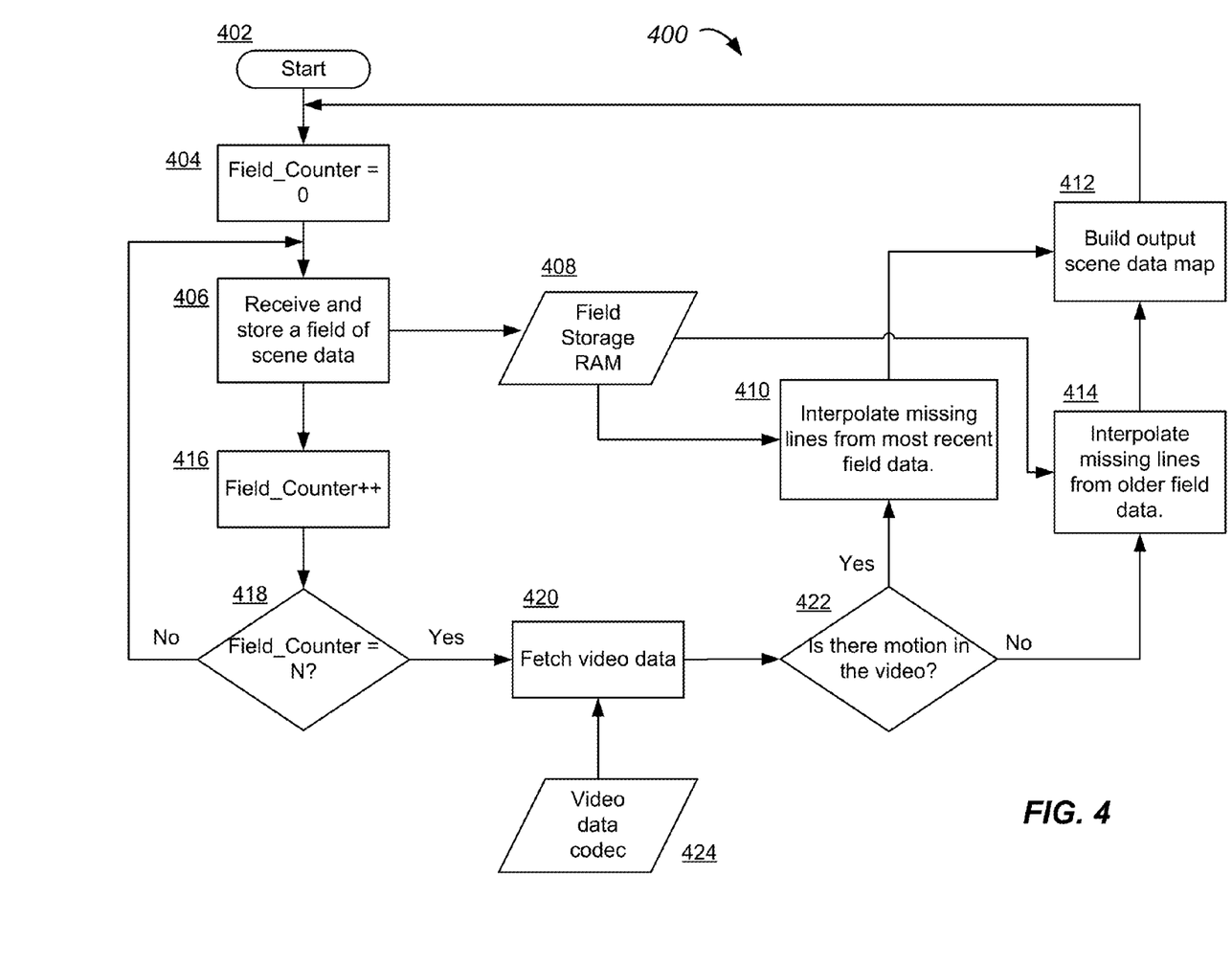
FIG. 4 is a flowchart diagram illustrating an example method of reconstructing the temperature data according to an embodiment of the invention.

FIG. 4 shows a flow diagram illustrating an example algorithm 400 for a method of de-interlacing represented in FIG. 3 and performed by the scene data de-interlacer 112 of FIG. 1. The method 400 begins at step 402 as the start, where scene data is received from the data stream transmitter 106 of FIG. 1. The scene data received may be represented by the interlacer output 208 of FIG. 2 or the de-interlacer input 302 of FIG. 3. At step 404, a parameter "field_counter" may initially be set to 0. The de-interlacer 112 of FIG. 1 may then receive and store a field of scene data (e.g., thermal data) in step 406. The scene data may be stored and processed in a field storage RAM in step 408. In step 416, the "field_counter" parameter may be incremented by 1, and it is checked in step 418 whether it has reached N (e.g., N=4 in FIGS. 2 and 3).

If "No", the de-interlacer 112 repeats steps 406 and 416 to receive and store another field of scene data. If "yes", the de-interlacer 112 fetches video data in step 420. Video data processed by the video data codec in step 424, is fetched in step 420. Analyzing the video data, it is determined whether there is motion in the video in step 422. If there is no motion (i.e., "No"), in step 414 the fields of scene data stored in the field storage RAM are interpolated with missing lines from older fields of scene data. However, if there is motion (i.e., "Yes"), in step 410 the fields of scene data are interpolated with missing lines from the most recent field data. Then the missing data lines from step 410 (e.g., recent field data representing motion) and the missing data lines from step 414 (e.g., previously stored data representing lack of motion) can be used to build an output scene data map in step 412. Then the method returns to step 404 to reset the "field_counter" restart at 0.

In another embodiment, as an alternative to interpolation, the missing data may be filled at the destination. A buffer may temporarily be filled with the lines that were coming in based on the frame count. Therefore, knowing what the frame number is or the frame count expected and the input video data, the de-interlacer may determine where to place the lines to create data to fill in for the missing data during reconstruction. If a packet is dropped, the buffer is not cleared out unless there is a rest of the entire system, as old data stored in the buffer may still be utilized in displaying a new temperature map.

Referring to FIG. 4, initially the field counter may be set to zero in reconstructing temperature data. On the reconstruction side so, the de-interlacer receives and stores a field of scene data 406, processed in RAM 408, and increments the counter. The de-interlacer receives a quarter of the field of scene data at a time.

When the counter reaches the N value at 418, the process moves to fetch new video data at 420, which allows use of the most recent video data. The de-interlacer may then determine if there is any motion in the scene at 422 and use that to determine how to interpolate the data. Motion data may be extrapolated from the most recent video data fetched in 420, or alternatively extrapolated from older video data, as shown at 414. The motion data is used in 410 and 412 to build a full scene data map. To achieve lower data rates, in an embodiment, interpolation may be skipped altogether because the temperature does not change significantly enough to compensate for the processing time of interpolating temperature data constantly.

Furthermore, in transmitting data over a wireless network (e.g., wi-fi), a significant amount of data may be lost. Therefore in an embodiment of the invention, if there motion in the video, then the de-interlacer interpolates the missing lines from the most recent field data. For example, if at the 4th cycle (where N=4), the de-interlacer fetches the video data, and motion is detected, then the de-interlacer fills in the temperatures for lines 1, 2 and 3 based on the temperature in the 4th frame, including the 4th line. Subsequently, in order to generate the 5th line, the de-interlacer interpolates 4 and 8 of what is stored in the field storage RAM at 408. 4th and 8th lines. And you will interpret the other lines from that.

If on the other hand there is no motion then, the de-interlacer may use stored in the field storage RAM, because it is full after N cycles. The field storage RAM may store all the temperature maps, for which the entire map may be used as received.

In another embodiment, there can be an intermediate stage where there is a little motion, which may be approached similarly as in noise reduction. For example, the interlacer or de-interlacer may utilize a certain percentage, or a greater percentage of the most recent data over what was in the other ones. The percentage of data from the more recent vide data may be weighted toward the most recent frame. As such, a sliding scale for proportions of recent video data may be implemented when the is little motion to interpolate some of the lines, however a significant amount of data may still be extrapolated from the stored data in the field storage RAM.

It should be appreciated that the specific steps illustrated in FIG. 4 provide a particular method of receiving partial scene data (e.g., thermal data) and reconstructing the partial scene data to result in full scene data (e.g., temperature data of a scene represented by a temperature map). Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

In one embodiment of the invention, scene data may be displayed at a slower frame rate than video data, for example, thermal data, such as a temperature map, may be displayed at a slower rate than the video data intentionally. Video data may be displayed at a rate to represent real-time, for example, 9 Hz to 30 Hz. However, a measurement cycle for the thermal data may be much lower. Therefore, a sample of the temperature data, such as a portion or a fraction of the temperature data, may be transmitted for every frame of video data. As a result, after a certain number of frames of video data have been transmitted, a full temperate map is eventually collected from the fractions of temperature data transmitted with each frame. For example, if one fourth of the temperature map is transmitted with each video frame, then after four video frames, a full temperature map can be received. Advantages achieved by transmitting fractions of the temperature data with each frame of video data include a reduced bandwidth since less data is being transmitted.

In another embodiment of the invention, a temperature map may be transmitted at a frame rate that is a fraction of the video frame rate. The video data may have a refresh rate of 9 Hz to 120 Hz (e.g., 9 Hz to 30 Hz), but the temperature data may have a lower refresh rate, for example 1 Hz to 120 Hz (e.g., 1 Hz to 5 Hz). In an example implementation using a 9/1 Hz ratio, the temperature map is shown every ninth frame of video data. However, in other embodiments, a greater bandwidth of the communication medium may be used to implement the full temperature map at rates closer to the video data frame rate. For example, the temperature refresh rate may range up to 30 Hz, or be at the same rate as the video refresh rate. Thus, embodiments of the present invention include a variety of frame rates for the video data (e.g., 9 Hz, 30 Hz, 60 Hz, 120 Hz, or the like) and a variety of frame rates for the video data (e.g., 1 Hz, 5 Hz, 9 Hz, 30 Hz, 60 Hz, 120 Hz, or the like). It should be noted that embodiments of the present invention are not limited to these particular frame rates.

In other embodiments of the invention, the video data and thermal data may be gathered by a device other than an infrared camera. Other suitable devices can include a visible light camera that is coupled with an acoustical imaging system or infrared imaging system.

In another embodiment of the invention, scene data may include acoustical data, which may be translated into a depth map of a scene.

In another embodiment of the invention, scene data can be sent at a fraction of the rate of the frame rate of the video data. Obtaining the video data may occur at a pre-determined frame rate. Thus, the transmitting a portion of the scene data may occur at a frame rate less than the predetermined frame rate of the video data.

Figure 5:
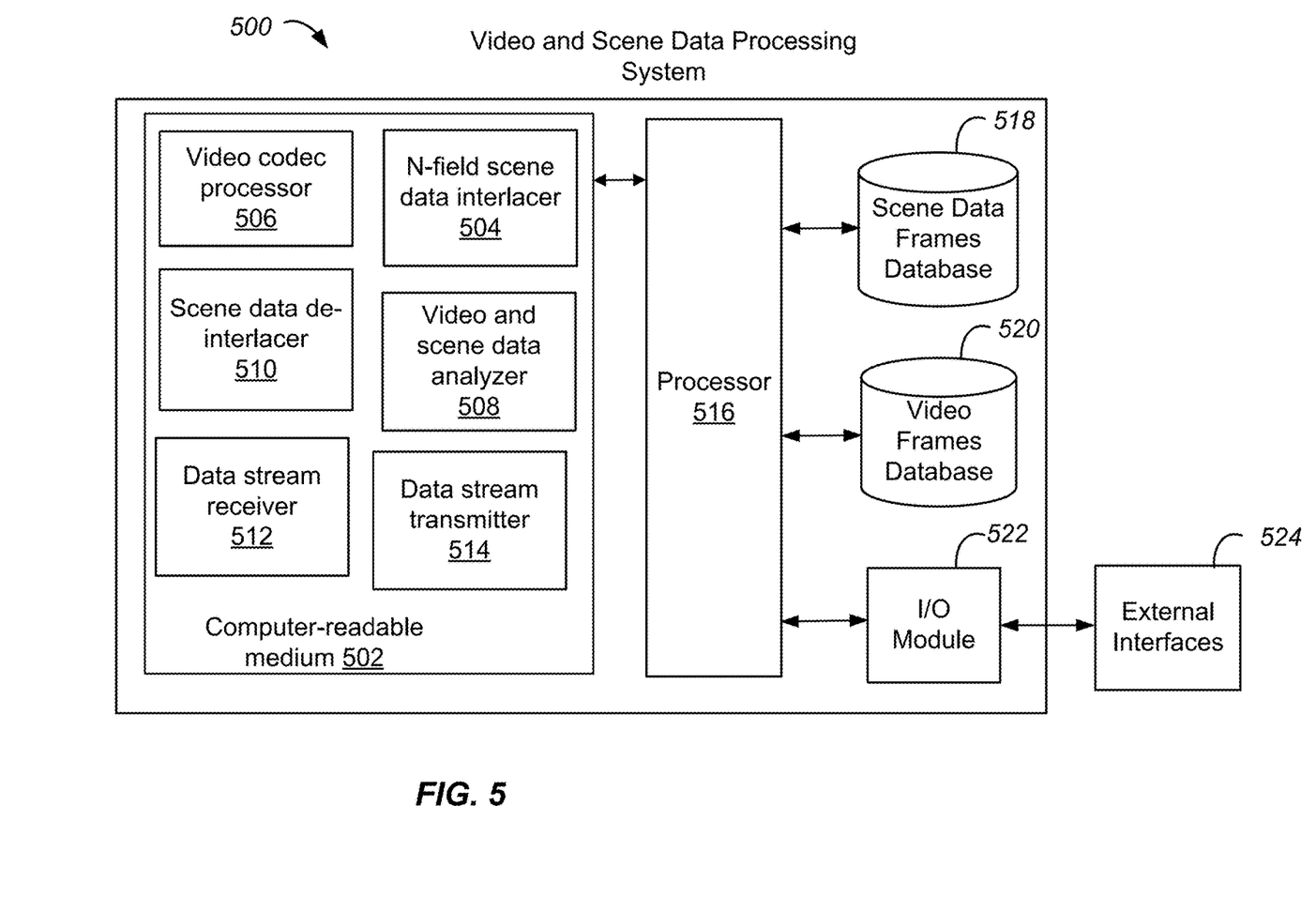
FIG. 5 shows a block diagram of an example system for transmitting temperature data in a video stream according to an embodiment of the invention.

FIG. 5 illustrates an exemplary system 500, such as a video and scene data processing system, enabled to execute the functions and processes described above. The system may comprise a processing module 516, such as a central processing unit, or other computing module for processing data. The system 500 may include a non-transitory computer-readable medium 502, such as a static or dynamic memory (e.g., read-access memory, or the like), storing code for executing tasks and processes described herein. For example, the computer-readable medium may comprise a video codec process 506 to process video data received. Scene data may be processed and interlaced by the N-field scene data interlacer 504. The data stream of combined video data from the video codec processed by the video codec processor 506 and the output from the N-field scene data interlacer 504 may be transmitted by data stream transmitter 514.

The computer-readable medium 502 may further comprise a data stream receiver 512 to receive the combined data stream. The scene data may be processed by an scene data de-interlacer 510. To reconstruct the missing data, a video and scene data analyzer 508 may access scene data frame database 518 and video frames database 520 via the processor 516 to determine what analytic frames to use as missing data lines. The missing data lines are used by the scene data de-interlacer 510 to reconstruct the scene data from the interlacer 504 output. The reconstructed scene data may be transmitted to external interfaces 524 (e.g., monitor, phone) through an I/O module 522, or other suitable interface module, via various communications methods. Example communication methods may be wired or wireless, using hardware and software components, such as a USB interface, Wi-Fi interface, and/or Bluetooth interface or other suitable communications interface.

FIG. 5 is a high level schematic diagram illustrating a data processing system upon which the disclosed embodiments may be implemented in certain embodiments. Embodiments may be practiced with various computer system configurations such as infrared cameras, hand-held devices, microprocessor systems, microprocessor-based or programmable user electronics, minicomputers, mainframe computers and the like. The embodiments can also be practiced in distributed computing environments where tasks are performed by remote processing devices that are linked through a wire-based or wireless network. FIG. 5 shows one example of a data processing system, such as data processing system 500, which may be used with the present described embodiments. Note that while FIG. 5 illustrates various components of a data processing system, it is not intended to represent any particular architecture or manner of interconnecting the components as such details are not germane to the techniques described herein. It will also be appreciated that network computers and other data processing systems which have fewer components or perhaps more components may also be used. The data processing system of FIG. 5 may, for example, a personal computer (PC), workstation, tablet, smartphone or other hand-held wireless device, or any device having similar functionality.

For example, the data processing system 500 can include a system bus which is coupled to a microprocessor, a Read-Only Memory (ROM), a volatile Random Access Memory (RAM), as well as other nonvolatile memory. The microprocessor may be coupled to a cache memory. System bus can be adapted to interconnect these various components together and also interconnect components to a display controller and display device, and to peripheral devices such as input/output ("I/O") devices. Types of I/O devices can include keyboards, modems, network interfaces, printers, scanners, video cameras, or other devices well known in the art. Typically, I/O devices are coupled to the system bus through I/O controllers. In one embodiment the I/O controller can include a Universal Serial Bus ("USB") adapter for controlling USB peripherals or other type of bus adapter.

RAM can be implemented as dynamic RAM ("DRAM") which requires power continually in order to refresh or maintain the data in the memory. The other nonvolatile memory can be a magnetic hard drive, magnetic optical drive, optical drive, DVD RAM, or other type of memory system that maintains data after power is removed from the system. While the nonvolatile memory can be a local device coupled with the rest of the components in the data processing system, it will be appreciated by skilled artisans that the described techniques may use a nonvolatile memory remote from the system, such as a network storage device coupled with the data processing system through a network interface such as a modem or Ethernet interface (not shown).

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a data processing system. That is, the techniques may be carried out in a computer or other data processing system in response executing sequences of instructions stored in memory. In various embodiments, hardwired circuitry may be used independently, or in combination with software instructions, to implement these techniques. For instance, the described functionality may be performed by specific hardware components containing hardwired logic for performing operations, or by any combination of custom hardware components and programmed computer components. The techniques described herein are not limited to any specific combination of hardware circuitry and software.

Embodiments herein may also be in the form of computer code stored on a computer-readable medium. Computer-readable media can also be adapted to store computer instructions, which when executed by a computer or other data processing system, such as data processing system 500, are adapted to cause the system to perform operations according to the techniques described herein. Computer-readable media can include any mechanism that stores information in a form accessible by a data processing device such as a computer, network device, tablet, smartphone, or any device having similar functionality. Examples of computer-readable media include any type of tangible article of manufacture capable of storing information thereon such as a hard drive, floppy disk, DVD, CD-ROM, magnetic-optical disk, ROM, RAM, EPROM, EEPROM, flash memory and equivalents thereto, a magnetic or optical card, or any type of media suitable for storing electronic data. Computer-readable media can also be distributed over a network-coupled computer system, which can be stored or executed in a distributed fashion.

Alternatively, a field-programmable gate array (FPGA) integrated circuit, application specific integrated circuit (ASIC), any suitable configurable hardware and/or any suitable configurable integrated circuit may be used to implement one or more of the functions and processes of the embodiments described herein.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of providing scene data in a video stream, the method comprising:
   receiving a video stream having a plurality of video frames characterized by a first frame rate;
   receiving a scene data stream including a thermal data stream, the scene data stream having a plurality of scene data frames with a second frame rate, each scene data frame including a plurality of scene data lines;
   generating a plurality of reduced scene data frames, wherein each of the plurality of reduced scene data frames is generated by:
   (a) extracting a subset of scene data lines from the plurality of scene data lines, wherein the subset is 1/N of the scene data lines;
   (b) forming a portion of a reduced scene data frame using the subset of scene data lines; and
   (c) iterating (a) and (b) N times; and
   transmitting the plurality of video frames at the first frame rate and the plurality of reduced scene data frames at the second frame rate in a data stream.

2. The method of claim 1 wherein the second frame rate is lower than the first frame rate.

3. The method of claim 1 wherein the thermal data stream comprises a temperature map associated with the video stream.

4. The method of claim 1 wherein the scene data further comprises sonar data.

5. The method of claim 1 wherein the first frame rate and the second frame rate are a same frame rate.

6. The method of claim 1 wherein the first frame rate ranges from 9 Hz to 120 Hz and the second frame rate ranges from 1 Hz to 120 Hz.

7. The method of claim 1, further comprising:
   receiving the data stream;
   separating the plurality of video frames from the plurality of reduced scene data frames;
   for each reduced scene data frame in the plurality of reduced scene data frames:
   identifying one or more missing data lines in the subset of scene data lines,
   correlating the plurality of reduced scene data frames with the plurality of video frames,
   providing the one or more missing data lines to the subset of scene data lines of the reduced scene data frame based on the correlation of the plurality of reduced scene data frames with the plurality of video frames, and
   creating a reconstructed scene data frame including the one or more missing data lines and the subset of scene data lines of the reduced scene data frame; and
   generating a plurality of reconstructed scene data frames using the reconstructed scene data frame created for each reduced scene data frame; and
   transmitting the plurality of reconstructed scene data frames.

8. The method of claim 7, further comprising transmitting the plurality of reconstructed scene data frames with the plurality of video data frames to an external display.

9. The method of claim 7 wherein the second frame rate is lower than the first frame rate.

10. The method of claim 7 wherein the data stream includes a plurality of packets, each packet including one reduced scene data frame in the plurality of reduced scene data frames and a subset of video frames in the plurality of video frames.

11. The method of claim 10 wherein the reduced scene data frame is reduced by a fraction inversely proportional to a number of video frames in the subset of video frames.

12. A system for providing scene data in a video stream, comprising:
   a detector configured to receive a video stream having a plurality of video frames with a first frame rate and receive a scene data stream including a thermal data stream, the scene data stream having a plurality of scene data frames with a second frame rate, each scene data frame including a plurality of scene data lines;
   a frame processing module configured to, for each scene data frame in the plurality of scene data frames:
   extract a subset of scene data lines in the plurality of scene data lines, thereby interlacing the scene data stream,
   create a reduced scene data frame including the subset of scene data lines, and
   generate a plurality of reduced scene data frames using the reduced scene data frame created for each scene data frame; and
   a first transmitter configured to transmit the plurality of reduced scene data frames at the second frame rate with the plurality of video frames at the first frame rate in a data stream.

13. The system of claim 12 wherein the first frame rate and the second frame rate are a same frame rate.

14. The system of claim 12 wherein the thermal data stream comprises a temperature map associated with the video stream.

15. The system of claim 12 wherein the scene data further comprises sonar data.

16. The system of claim 12, further comprising:
   a receiver configured to receive the data stream and separate the plurality of video frames from the plurality of reduced scene data frames;
   a frame reconstructing module configured to, for each reduced scene data frame in the plurality of reduced scene data frames:
   identify one or more missing data lines in the subset of scene data lines,
   correlate the plurality of reduced scene data frames with the plurality of video frames,
   provide the one or more missing data lines to the subset of scene data lines of the reduced scene data frame based on the correlation of the plurality of reduced scene data frames with the plurality of video frames,
   create a reconstructed scene data frame including the one or more missing data lines and the subset of scene data lines of the reduced scene data frame, and
   generate a plurality of reconstructed scene data frames using the reconstructed scene data frame created for each reduced scene data frame; and
   a second transmitter configured to transmit the plurality of reconstructed scene data frames.

17. The system of claim 16 wherein the second transmitter is configured to transmit the plurality of reconstructed scene data frames with the plurality of video data frames to an external display.

18. The system of claim 16 wherein the second frame rate is lower than the first frame rate.

19. The system of claim 16 wherein the data stream includes a plurality of packets, each packet including one reduced scene data frame in the plurality of reduced scene data frames and a subset of video frames in the plurality of video frames.

20. The method of claim 19 wherein the reduced scene data frame is reduced by a fraction inversely proportional to a number of video frames in the subset of video frames in each packet.

\* \* \* \* \*